March 6, 1928.
F. C. ROOD
MIXER
Filed Feb. 27, 1923
1,661,681
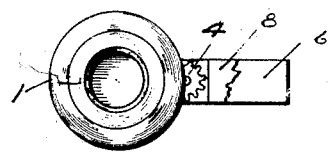
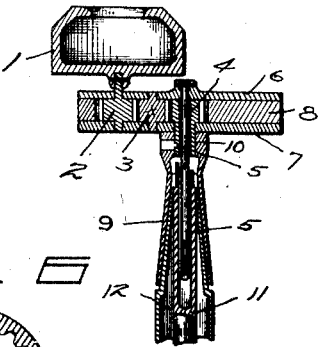
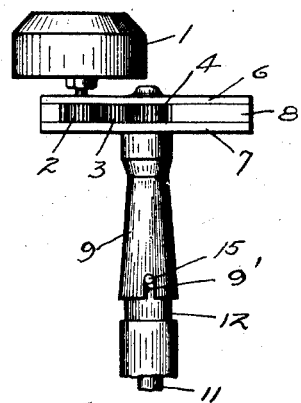
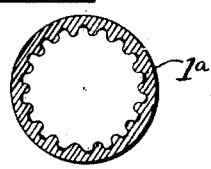
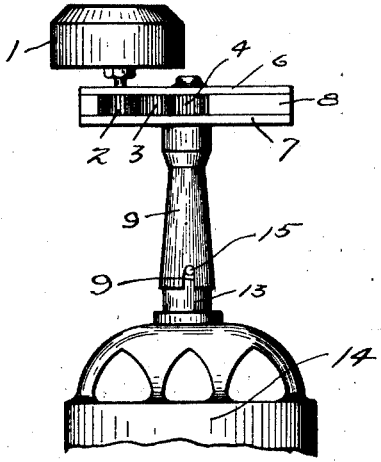
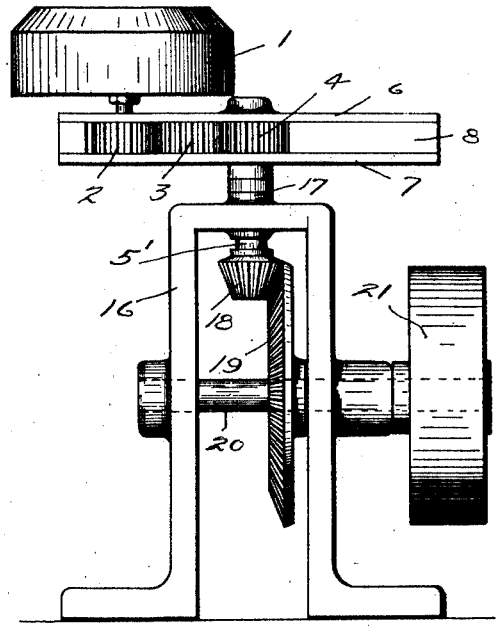
INVENTOR.
Fletcher C. Rood.
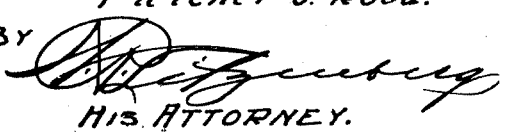
HIS ATTORNEY.

Patented Mar. 6, 1928.

1,661,681

UNITED STATES PATENT OFFICE.

FLETCHER C. ROOD, OF WALLA WALLA, WASHINGTON.

MIXER.

Application filed February 27, 1923. Serial No. 621,554.

My invention relates to mixers, and while I have shown it in the accompanying drawings as a small machine particularly adapted for use by dentists in mixing alloy filings with mercury to make amalgam fillings with and which can be used with a dental engine, or other suitable power means, it is not intended that the invention shall be limited to this form or this purpose, for the heart and principle thereof can be embodied in various types and sizes of machines, and used for many purposes.

The invention is found in the provision of a container with mechanical means for bodily moving said container around a center with means for holding said container from turning about its own axis, thus swirling the contents of the container around the inside thereof, centrifugal force operating to throw the contents forcibly against the outer wall of the container and at the same time keeping it rolling and mixing and grinding, and if any hard rolling elements are placed in the container with the matter to be mixed, such elements will operate to crush and pulverize the softer matter therein.

The container can be of any suitable size and of any suitable material, depending upon the use to which it is to be put, and preferably has an open top of less diameter than the diameter of the body of the container, thus preventing the contents from being thrown out.

In ordinary practice, mercury and filings are mixed in a glass mortar with a glass pestle which takes several minutes to make a proper mix for dental use. With my improved mixer, I have been able to greatly reduce the time required to make a proper mix and accomplish the same or better result in from twenty to thirty seconds.

In order to fully explain my invention, I have illustrated one practical embodiment thereof on the accompanying sheet of drawings, which I will now describe.

Figure 1 is a top plan view of a container with one kind of mechanism for revolving the container around a center and at the same time holding the container from turning about its own axis;

Figure 2 is a side elevation of said mechanism, showing the mechanism mounted on the hand piece of a dental engine;

Figure 3 is a vertical sectional view thereof;

Figure 4 shows the container and driving mechanism connected to a motor shaft for driving it;

Figure 5 shows the invention on a larger scale with power means adapted to be operated by a belt or its equivalent; and Figure 6 is a horizontal sectional view through a container having corrugated or rough inner wall.

Referring more in detail to the drawings, the container 1, is shown secured to a gear 2, which meshes with an idler gear 3, in mesh with a fixed gear, 4, on a driving shaft, 5. Said gears are held between two bearing plates 6 and 7, with a counterweight, 8, at their opposite ends, as shown. A shank 9 is shown secured to the driving gear 4, as at 10, and operates to hold said gear stationary while the driving shaft 5, which turns in the gear 4, drives the bearing plates 6 and 7, and all the other parts carried thereon. The driving shaft 5 extends into the shank 9, and receives a driving member 11, in the nozzle-like part, 12, of a dental hand piece. Or a similar part, 13, on a motor 14, as indicated in Fig. 4. A pin 15, in the side of the parts 12 and 13, fit a notch 9' in the shank 9, for holding said shank and the gear 4 from turning.

Thus when the little machine is mounted on the hand-piece of a dental engine, or other propelling means, the bearing plates or members, 6 and 7, and the container are all driven around the center represented by the driving shaft 5, but through the idler gear 3, and the gear 2, said container is prevented from turning about its own axis.

In Fig. 5, I have shown a frame 16, with a bearing 17, which takes the place of the shank 9, with a gear or pinion 18 on the driving shaft, 5', said pinion 18, meshing with a driving gear 19, on a shaft 20, in said frame 16, with a driving pulley or member 21, for a driving said parts on a large machine.

What I claim is:

1. A mixer of the character shown and described for mixing alloy filings with mercury to make amalgam fillings for teeth, including in combination a drive shaft adapted to be connected with and driven from the hand piece of a dental engine, a gear on said shaft, means for holding said gear stationary, a pair of plates mounted to revolve with said shaft, an idler gear and a driving gear between said plates and in mesh with each other said idler gear being in mesh with said stationary gear, a container having an open top mounted to turn about a vertical axis with said driving gear above said plates, and means for preventing the material therein from being thrown therefrom as said container is revolved and rotated through said connections, substantially as shown.

2. A mixer of the character shown and described including in combination, a drive shaft, a pair of plates spaced apart axially of said shaft and adapted to be driven thereby, a fixed gear between said plates on said shaft and in which said shaft turns, an idler gear between said plates, in mesh with said fixed gear, a driving gear between said plates in mesh with said idler gear, a container connected to be rotated about its axis and the axis of said driving gear, above said plates, said container having means for preventing the contents from being thrown therefrom, and a counterweight connected with said plates to counterbalance said container and said idler gear and said driving gear.

Signed at Walla Walla, Walla Walla County, Washington, this 13th day of February, 1923.

FLETCHER C. ROOD.